US010142780B2

(12) United States Patent
Mannami et al.

(10) Patent No.: US 10,142,780 B2
(45) Date of Patent: Nov. 27, 2018

(54) MOBILE WIRELESS TERMINAL AND COMMUNICATION SYSTEM FOR PROVIDING GROUP COMMUNICATION

(71) Applicant: JVC KENWOOD Corporation, Yokohama-shi, Kanagawa (JP)

(72) Inventors: Kazuki Mannami, Yokohama (JP); Hiroyuki Nakajima, Yokohama (JP); Shimpei Kamaya, Yokohama (JP); Atsushi Saito, Yokohama (JP); Yasuma Suzuki, Yokohama (JP); Makoto Inada, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/221,693

(22) Filed: Jul. 28, 2016

(65) Prior Publication Data

US 2017/0034658 A1    Feb. 2, 2017

(30) Foreign Application Priority Data

Jul. 31, 2015  (JP) .................................. 2015-151428
Jul. 31, 2015  (JP) .................................. 2015-151429

(51) Int. Cl.
*H04W 4/02* (2018.01)
*H04W 68/00* (2009.01)
*H04W 8/18* (2009.01)
*H04W 88/08* (2009.01)
*H04W 88/02* (2009.01)

(52) U.S. Cl.
CPC ......... *H04W 4/023* (2013.01); *H04W 68/005* (2013.01); *H04W 8/186* (2013.01); *H04W 88/02* (2013.01); *H04W 88/08* (2013.01)

(58) Field of Classification Search
CPC .. G06Q 50/30; G06Q 10/02; G06Q 10/06311; G06Q 2240/00; G01C 21/3676; G01C 21/26; G01C 21/30; G01C 21/34; G01C 21/3438; G01S 19/42; H04W 4/02
USPC ......................... 455/404.1–404.2, 456.1–457
See application file for complete search history.

(56) References Cited

U.S. PATENT DOCUMENTS

| 2008/0159492 | A1* | 7/2008 | Moore ................... H04M 3/436 379/88.22 |
| 2012/0214535 | A1* | 8/2012 | Jorgensen ............. H04M 15/00 455/519 |
| 2016/0100364 | A1* | 4/2016 | Bitar .................. H04W 52/0225 455/456.2 |

FOREIGN PATENT DOCUMENTS

JP          06-309596       11/1994

\* cited by examiner

*Primary Examiner* — Allahyar Kasraian
(74) *Attorney, Agent, or Firm* — Amin, Turocy & Watson LLP (57) ABSTRACT

A mobile wireless terminal includes a receiver and a controller. The receiver receives communication information including transmission information and destination position information which shows a position of a destination from a base station. The controller is configured to perform control to delay increasingly notification starting time at which the transmission information is started to be provided as a distance between the position indicated by the destination position information received by the receiver and a position of a local station is longer.

1 Claim, 11 Drawing Sheets

COMMUNICATION INFORMATION

| Group ID | DESTINATION-SPECIFIED CALL INFORMATION | DESTINATION POSITION INFORMATION | TRANSMISSION INFORMATION |
|---|---|---|---|
| | | | |

| Group ID | DESTINATION-SPECIFIED CALL INFORMATION | DESTINATION POSITION INFORMATION | PRIORITY RANGE INFORMATION: WITHIN X km FROM DESTINATION | AMOUNT OF RANGES: 3 | DISTANCE INFORMATION: Y km | DELAY TIME INFORMATION: n (sec) | TRANSMISSION INFORMATION |
|---|---|---|---|---|---|---|---|

Columns 5–6 (AMOUNT OF RANGES, DISTANCE INFORMATION) are grouped as DELAY RANGE INFORMATION. The entire table constitutes COMMUNICATION INFORMATION.

FIG.10

ASSOCIATION INFORMATION

| RANGE INFORMATION | DELAY TIME INFORMATION |
|---|---|
| RANGE A | 0 (sec) |
| RANGE B | n (sec) |
| RANGE C | 2n (sec) |

FIG.11

COMMUNICATION INFORMATION

| Group ID | DESTINATION-SPECIFIED CALL INFORMATION | ASSOCIATION INFORMATION | TRANSMISSION INFORMATION |
|---|---|---|---|

FIG.12

MOBILE WIRELESS TERMINAL AND COMMUNICATION SYSTEM FOR PROVIDING GROUP COMMUNICATION

CROSS-REFERENCE TO RELATED APPLICATION(S)

The present application claims priority to and incorporates by reference the entire contents of Japanese Patent Application No. 2015-151428 filed in Japan on Jul. 31, 2015 and Japanese Patent Application No. 2015-151429 filed in Japan on Jul. 31, 2015.

BACKGROUND

1. Field

Embodiments of the present invention relates to a mobile wireless terminal, a base station, and a communication system.

2. Description of the Related Art

There have been conventionally techniques for providing group communication in which a plurality of terminal devices is included in advance in a group such that the plurality of terminal devices in the group can communicate mutually at the same time.

For example, Japanese Patent Application Laid-open No. 6-309596 discloses a technique by which position information acquired from a GPS (global positioning system) is used to calculate a distance between a position of a mobile station and a position specified from a base station (fixed station), and the communication group is dynamically changed in such a manner that the mobile station can respond to a call within a predetermined range.

In the normal operation of services necessary to reach a customer such as taxi dispatch or home delivery, for example, the base station makes a request for response and provides information on the destination and others by voice to all the mobile stations belonging to the group, so that the mobile station that can respond to the request most quickly at any position within the coverage of wireless communication can acquire the customer. In terms of the time of arrival at the destination and efficient service operation, it is important to assign the task to the mobile station closer to the destination on a priority basis. However, there is no system in which the mobile station closer to the destination can make a response on a priority basis.

SUMMARY

It is an object of embodiments to at least partially solve the problems in the conventional technology.

There is provided a mobile wireless terminal comprising: a receiver configured to receive from a base station communication information including transmission information and destination position information which shows a position of a destination; and a controller configured to perform control to delay increasingly notification starting time at which the transmission information is started to be provided as a distance between the position indicated by the destination position information received by the receiver and a position of the mobile wireless terminal is longer.

Furthermore, there is provided a mobile wireless terminal, comprising: a receiver configured to receive from a base station communication information including transmission information and destination position information which shows a position of a destination; and a controller configured to perform control to delay increasingly notification starting time at which the transmission information is started to be provided as time required for moving from a position of the mobile wireless terminal to the position indicated by the destination position information received by the receiver is longer.

There is provided a communication system comprising a base station and a plurality of mobile wireless terminals communicating wirelessly with the base station, wherein the base station includes a transmitter configured to transmit communication information including transmission information and destination position information which shows a position of a destination to the plurality of mobile wireless terminals, and each of the plurality of mobile wireless terminals includes; a receiver configured to receive the communication information from the base station, and a controller configured to perform control to delay increasingly notification starting time at which the transmission information is started to be provided as a distance between the position indicated by the destination position information received by the receiver and a position of the mobile wireless terminal is longer.

There is provided a mobile wireless terminal comprising: a receiver configured to receive communication information including transmission information and association information in which one delay time, which shows a time to be delayed at which the transmission information is started to be provided and has a smaller value as a destination is closer, is associated with one range for each of the one or more ranges in the range information; and a controller configured to, when a position of the mobile wireless terminal is included in the one or more ranges in the range information included in the association information received by the receiver, perform control to delay notification starting time at which the transmission information is started to be provided according to the delay time in the delay time information associated with the range in the range information including the position of the mobile wireless terminal.

There is provided a base station communicating with a plurality of mobile wireless terminals, comprising: a communication information generator configured to generate communication information including transmission information and association information in which one delay time, which shows a time to be delayed at which the transmission information is started to be provided and has a smaller value as a destination is closer, is associated with one range for each of the one or more ranges in the range information; and a transmitter configured to transmit the communication information to the mobile wireless terminals.

There is provided a communication system comprising a base station and a plurality of mobile wireless terminals communicating wirelessly with the base station, wherein the base station includes; a communication information generator configured to generate communication information including transmission information and association information in which one delay time, which shows a time to be delayed at which the transmission information is started to be provided and has a smaller value as a destination is closer, is associated with one range for each of the one or more ranges in the range information; and a transmitter configured to transmit the communication information to the mobile wireless terminals, and each of the mobile wireless terminals includes; a receiver configured to receive the communication information from the base station, and a controller configured to, when a position of the mobile wireless terminal is included in the one or more ranges in the range information included in the association information received by the receiver, perform control to delay notification starting time at which the transmission information is started to be provided according to the delay time in the delay time information associated with the range in the range information including the position of the mobile wireless terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a mobile wireless terminal, a base station, and a communication system will be described below in detail with reference to the attached drawings. The present application is not limited to the following embodiments.

First Embodiment

Figure 1:
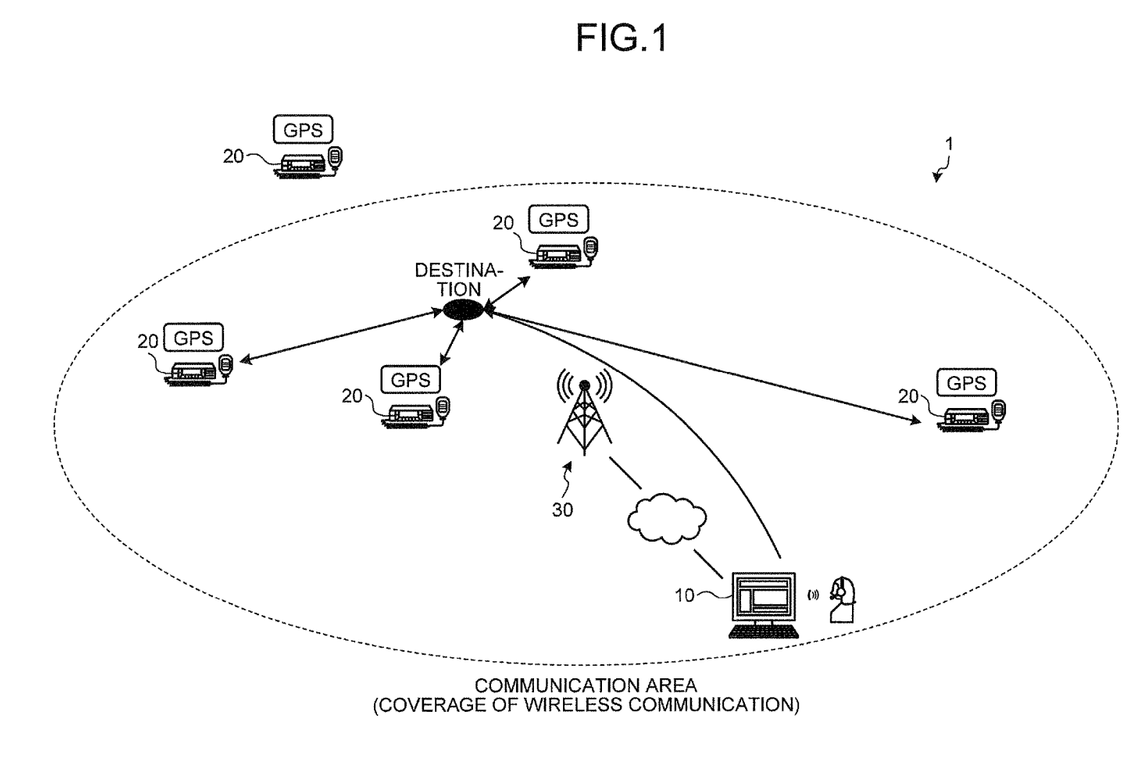
FIG. 1 is a diagram illustrating an example of a general configuration of a communication system of a first embodiment.

FIG. 1 is a diagram illustrating an example of a general configuration of a communication system 1 of a first embodiment. As illustrated in FIG. 1, the communication system 1 includes a base station 10 and a plurality of mobile wireless terminals 20. The base station 10 transmits communication information described later, including at least information to be transmitted (hereinafter called "transmission information"), to a communication area (coverage of wireless communication) via a relay station 30. Accordingly, the mobile wireless terminals 20 within the communication area can receive the communication information from the base station 10 but the mobile wireless terminal 20 outside the communication area cannot receive the communication information from the base station 10. In the example of FIG. 1, the wireless communication between the base station 10 and the mobile wireless terminals 20 within the communication area is half-duplex wireless communication. The half-duplex wireless communication is a mode of wireless communication in which only either transmission or reception can be performed at a time.

Figure 2:
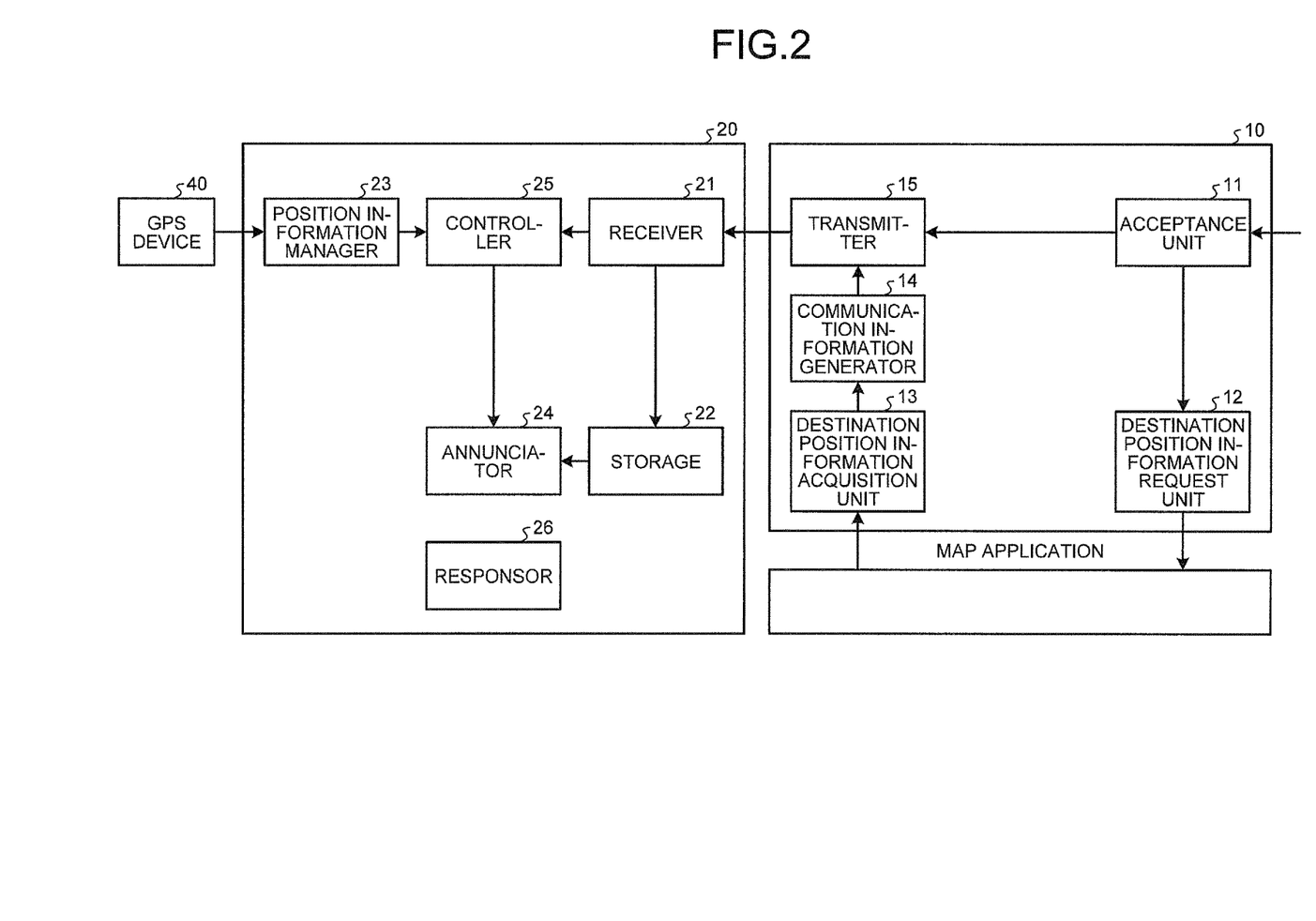
FIG. 2 is a diagram illustrating an example of functions possessed by a base station and each mobile wireless terminal included in the communication system of the first embodiment.

FIG. 2 is a diagram illustrating an example of functions possessed by the base station 10 and each of the mobile wireless terminals 20 included in the communication system 1 of the embodiment. For the sake of illustration, in the example of FIG. 2, only one mobile wireless terminal 20 is illustrated. The other mobile wireless terminals 20 included in the communication system 1 have the same functions.

As illustrated in FIG. 2, the base station 10 has an acceptance unit 11, a destination position information request unit 12, a destination position information acquisition unit 13, a communication information generator 14, and a transmitter 15.

The acceptance unit 11 accepts various inputs according to the operator's operation of the base station 10. For example, in the acceptance unit 11, a destination and a group (to perform group communication) are specified, thereby a request for transmission of transmission information to the specified group (for the sake of description, hereinafter called "first transmission request") is accepted. In addition, for example, in the acceptance unit 11, a group is specified without a destination, thereby a request for transmission of transmission information to the specified group (for the sake of description, hereinafter, called "second transmission request") may be accepted. As an example, the transmission information of the embodiment includes audio information corresponding to contents of an operator's speech during pushing a PTT (push to talk) switch, but is not limited to this.

Descriptions will be given below as to a case in which the acceptance unit 11 accepts the first transmission request and a case in which the acceptance unit 11 accepts the second transmission request. First, the case in which the acceptance unit 11 accepts the first transmission request will be explained. The destination position information request unit 12 makes a request for destination position information which shows a position of the destination specified by the first transmission request. In this example, the destination position information request unit 12 requests for the destination position information to a map application as an application providing map information prepared in advance or the like.

The destination position information acquisition unit 13 acquires the destination position information. In this example, the destination position information acquisition unit 13 acquires the destination position information requested by the destination position information request unit 12 from the map application and the like. The destination position information can be represented by information which shows longitude and latitude, for example.

Figure 3:
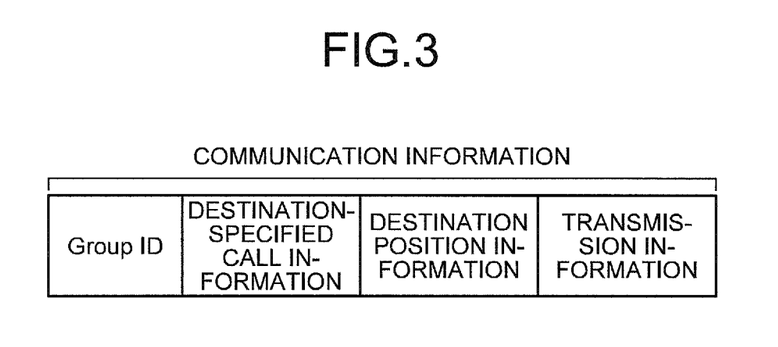
FIG. 3 is a diagram illustrating an example of communication information of the first embodiment.

The communication information generator 14 generates communication information including the transmission information and the destination position information which shows the position of the destination. In this example, the communication information further includes a group ID for identification of a group to perform group communication and destination-specified call information indicating whether a received call includes the specified destination. In the embodiment, the communication information generator 14 generates the communication information including the transmission information corresponding to the first transmission request (the transmission information as a target of the first transmission request), the destination position information acquired by the destination position information acquisition unit 13, the group ID for identification of the group specified by the first transmission request, and the destination-specified call information indicating that a received call includes the specified destination. FIG. 3 is a diagram illustrating an example of the communication information generated by the communication information generator 14.

Descriptions will be continuously given with reference to FIG. 2. The transmitter 15 transmits the communication information generated by the communication information generator 14.

Next, the case in which the acceptance unit 11 accepts the second transmission request will be explained. When the acceptance unit 11 accepts the second transmission request, the transmitter 15 transmits the communication information including the transmission information corresponding to the second transmission request, the group ID for identification of the group specified by the second transmission request, and the destination-specified call information indicating that a received call does not include the specified destination. The presence or absence of the destination position information may play the role of the destination-specified call information indicating whether a received call includes the specified destination.

In the embodiment, the base station 10 has a hardware configuration including CPU and storage devices such as a ROM, and a RAM. The CPU executes programs stored in the storage devices to implement the foregoing functions (the acceptance unit 11, the destination position information request unit 12, the destination position information acquisition unit 13, the communication information generator 14, and the transmitter 15).

Descriptions will be continuously given with reference to FIG. 2. As illustrated in FIG. 2, the mobile wireless terminal 20 has a receiver 21, a storage 22, a position information manager 23, an annunciator 24, a controller 25, and a responsor 26. The receiver 21 receives the communication information from the base station 10. The storage 22 stores the transmission information received by the receiver 21. In this example, the storage 22 stores the audio information included in the transmission information received by the receiver 21.

The position information manager 23 manages position information which shows a position of the mobile wireless terminal 20 (hereinafter, also called "local station"). In this example, the mobile wireless terminal 20 is provided with a GPS device 40 that receives a signal from communication satellites and detects own current position. The position information manager 23 acquires the position information from the GPS device 40 periodically and holds the acquired position information.

The annunciator 24 provides the transmission information. More specifically, the annunciator 24 outputs a notification starting sound or reproduces voice information stored in the storage 22 under control of the controller 25.

The controller 25 performs control to delay increasingly the notification starting time at which the transmission information is started to be provided as a distance between the position indicated by the destination position information received by the receiver 21 and a position of the local station is longer.

In this example, when the group identified by the group ID included in the communication information coincides with the group to which the local station belongs, and the destination-specified call information included in the communication information indicates that a received call includes the specified destination, the controller 25 performs the foregoing control (by which the notification starting time is increasingly delayed as the distance between the position indicated by the destination position information received by the receiver 21 and the position of the local station is longer). More specifically, the controller 25 calculates the distance between the position indicated by the destination position information included in the communication information and the own current position of the local station held by the position information manager 23, and decides the notification starting time so as to be delayed increasingly as the calculated distance is longer. For example, the notification starting time may be delayed by one second for increase of 100 m in the distance. In this case, the notification starting time may be decided such that, when the distance is shorter than 100 m, for example, the provision of the transmission information is started immediately. After the decision of the notification starting time, the controller 25 sets a timer for detecting arrival of the notification starting time (in this case, also regarded as a waiting time until the start of the notification). When the timer has been timed out, the controller 25 controls the annunciator 24 to provide the transmission information.

In this example, after the arrival of the notification starting time, the controller 25 performs control to reproduce the voice information stored in the storage 22. More specifically, after the arrival of the notification starting time, the controller 25 controls the annunciator 24 to output the notification starting sound, and then controls the annunciator 24 to reproduce the voice information stored in the storage 22.

For example, the controller 25 may be configured so as not to provide the transmission information when the distance between the position indicated by the destination position information received by the receiver 21 and the own current position of the local station is equal to or more than a threshold. For example, the threshold may be held in advance in the mobile wireless terminal 20, or the threshold may be included in the communication information transmitted from the base station 10. The value of the threshold can be set arbitrarily depending on the communication conditions or the like.

Descriptions will be continuously given with reference to FIG. 2. The responsor 26 is substantially a transmitter that includes a microphone for detecting voice of a user of the mobile wireless terminal 20 and a PTT switch for switching between transmitting and receiving operations, although they are not illustrated. When the user of the mobile wireless terminal 20 makes a response for the transmission information to the base station 10, the responsor 26 transmits response information indicating that the response has been already made. The response information is also transmitted to other mobile wireless terminals 20 via the relay station 30. That is, when the local station makes a response for the transmission information, the responsor 26 transmits to the other mobile wireless terminals 20 the response information indicating that the response has been already made. In the embodiment, when the response information is received from another mobile wireless terminal 20 and the own local station is providing the transmission information, the controller 25 controls the annunciator 24 to stop providing the transmission information. When the response information is received from another mobile wireless terminal 20 and the provision of the transmission information is yet to be started, the controller 25 controls the annunciator 24 so as not to provide the transmission information. In addition, the controller 25 may control the annunciator 24 to provide a notification that the response of another mobile wireless terminal 20 has been already made.

In the embodiment, the mobile wireless terminal 20 has a hardware configuration including a CPU and storage devices such as a ROM, and a RAM. The CPU executes programs stored in the storage devices to implement the foregoing functions (the receiver 21, the position information manager 23, the annunciator 24, the controller 25, and the responsor 26). The storage 22 is realized by storage devices such as a ROM and a RAM.

Figure 4:
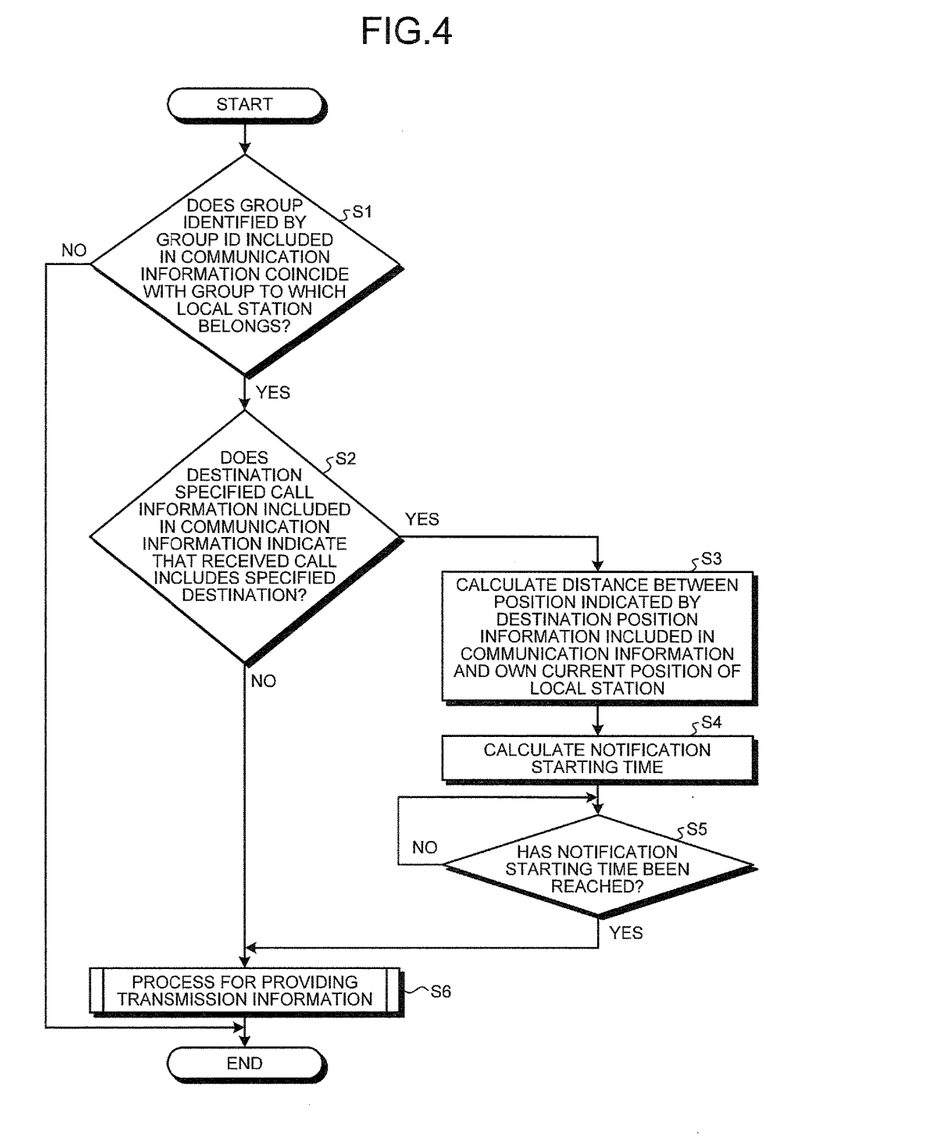
FIG. 4 is a flowchart of an operation example of the mobile wireless terminal of the first embodiment.

FIG. 4 is a flowchart of an operation example of the mobile wireless terminal 20 in the embodiment when the communication information is received from the base station 10. As described in FIG. 4, the controller 25 determines whether the group identified by the group ID included in the communication information received by the receiver 21 coincides with the group to which the local station belongs (step S1). When the result at step S1 is negative (step S1: No), the controller 25 terminates the process. When the result at step S1 is affirmative (step S1: Yes), the controller 25 determines whether the destination-specified call information included in the communication information indicates that a received call includes the specified destination (step S2).

When the result at step S2 is affirmative (step S2: Yes), the controller 25 calculates the distance between the position indicated by the destination position information included in the communication information and the own current position of the local station (step S3). Then, the controller 25 calculates the notification starting time (step S4). As described above, the controller 25 calculates the notification starting time so as to be delayed increasingly as the distance calculated at step S3 is longer, and then sets the timer.

Next, the controller 25 determines whether the notification starting time has been reached (step S5). In this example, it is possible to determine whether the notification starting time has been reached by checking if the timer has been timed out. When the result at step S5 is affirmative (step S5: Yes), the controller 25 controls the annunciator 24 to provide the transmission information. That is, the controller 25 performs the process for providing the transmission information (step S6). The detailed contents of the process are as described above.

When the result at step S2 is negative (step S2: No), the controller 25 moves directly to step S6.

As described above, the mobile wireless terminal 20 of the embodiment performs the control to delay increasingly the notification starting time at which the transmission information is started to be provided as the distance between the position indicated by the destination position information included in the communication information received from the base station 10 and the own position of the local station is longer. This makes it possible to implement the system in which the mobile station closer to the destination can make a response on a priority basis.

Second Embodiment

Next, a second embodiment will be explained. Descriptions of the parts identical to the first embodiment will be omitted.

Figure 5:
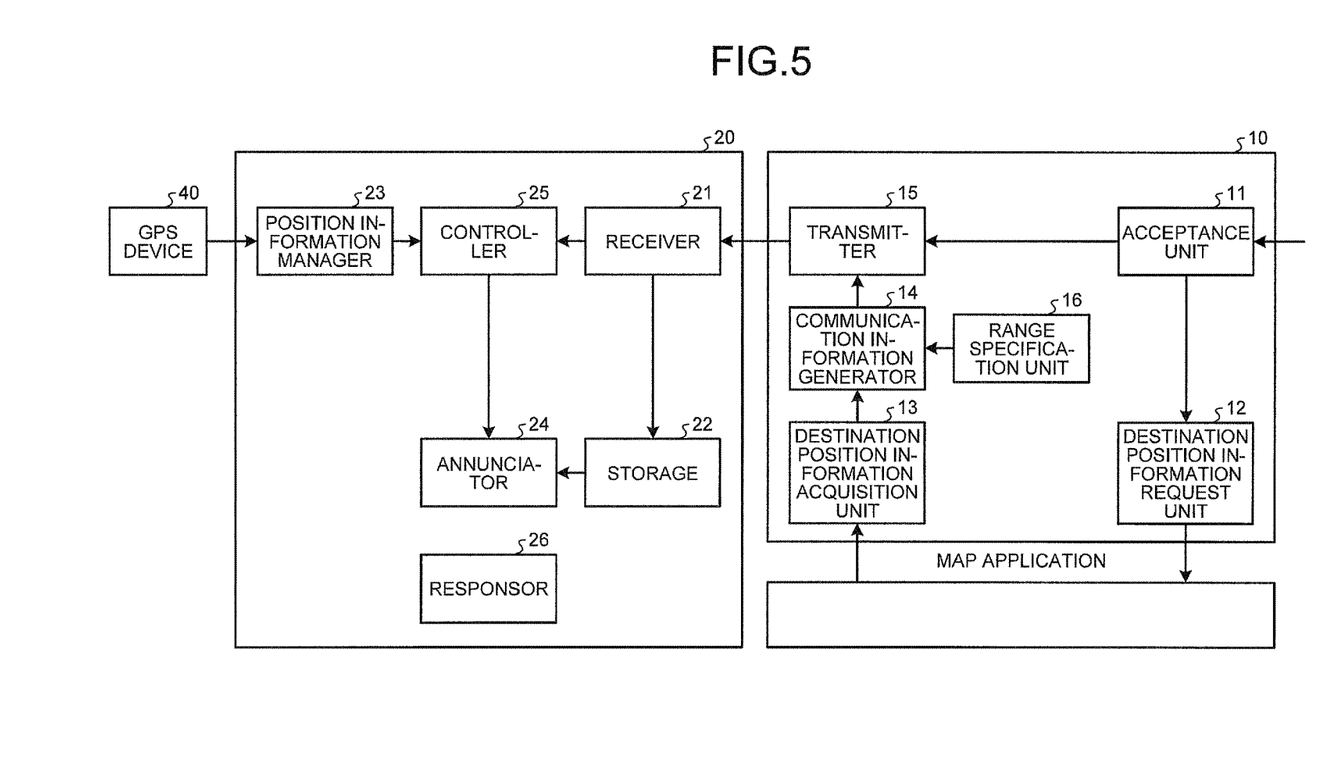
FIG. 5 is a diagram illustrating an example of functions possessed by a base station and each mobile wireless terminal included in the communication system of a second embodiment.

FIG. 5 is a diagram illustrating an example of functions possessed by a base station 10 and each of a mobile wireless terminals 20 included in a communication system 1 of the embodiment. As illustrated in FIG. 5, the base station 10 is different from that of the first embodiment in further including a range specification unit 16.

The range specification unit 16 specifies a priority range as a range in which the transmission information is provided on a priority basis (in the communication area) and at least one delay range as a range in which the transmission information is delayed to be provided. For example, the range specification unit 16 may specify the priority range and the at least one delay range according to the operator's operation or may specify the predetermined priority range and the at least one delay range.

A communication information generator 14 of the embodiment generates the communication information including the transmission information corresponding to the first transmission request, the destination position information acquired by a destination position information acquisition unit 13, the group ID for identification of the group specified by the first transmission request, priority range information which shows the priority range specified by the range specification unit 16, delay range information which shows the at least one delay range specified by the range specification unit 16, and delay time information for specifying each delay time for each delay range.

Figure 6:
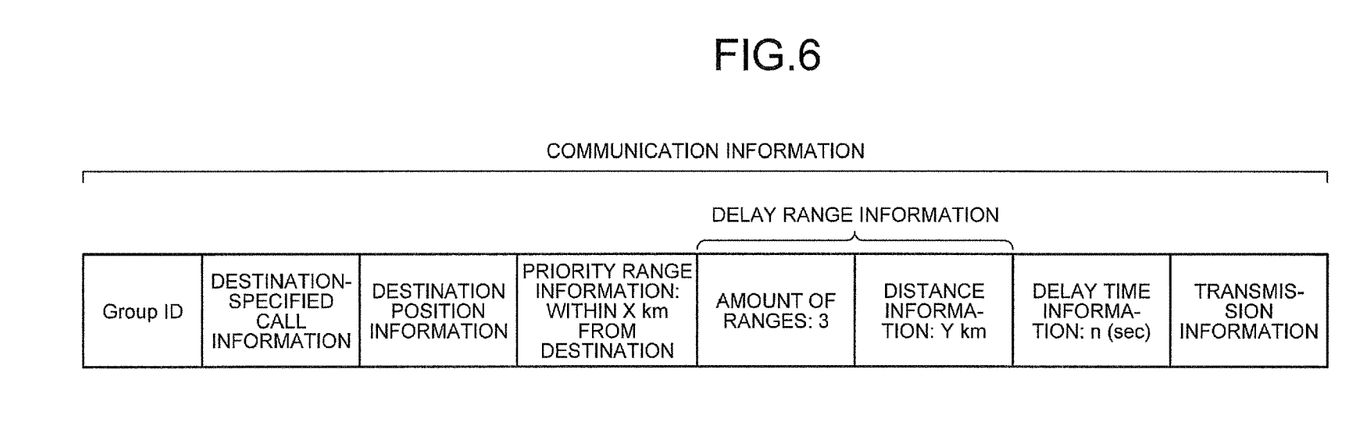
FIG. 6 is a diagram illustrating an example of communication information of the second embodiment.
Figure 7:
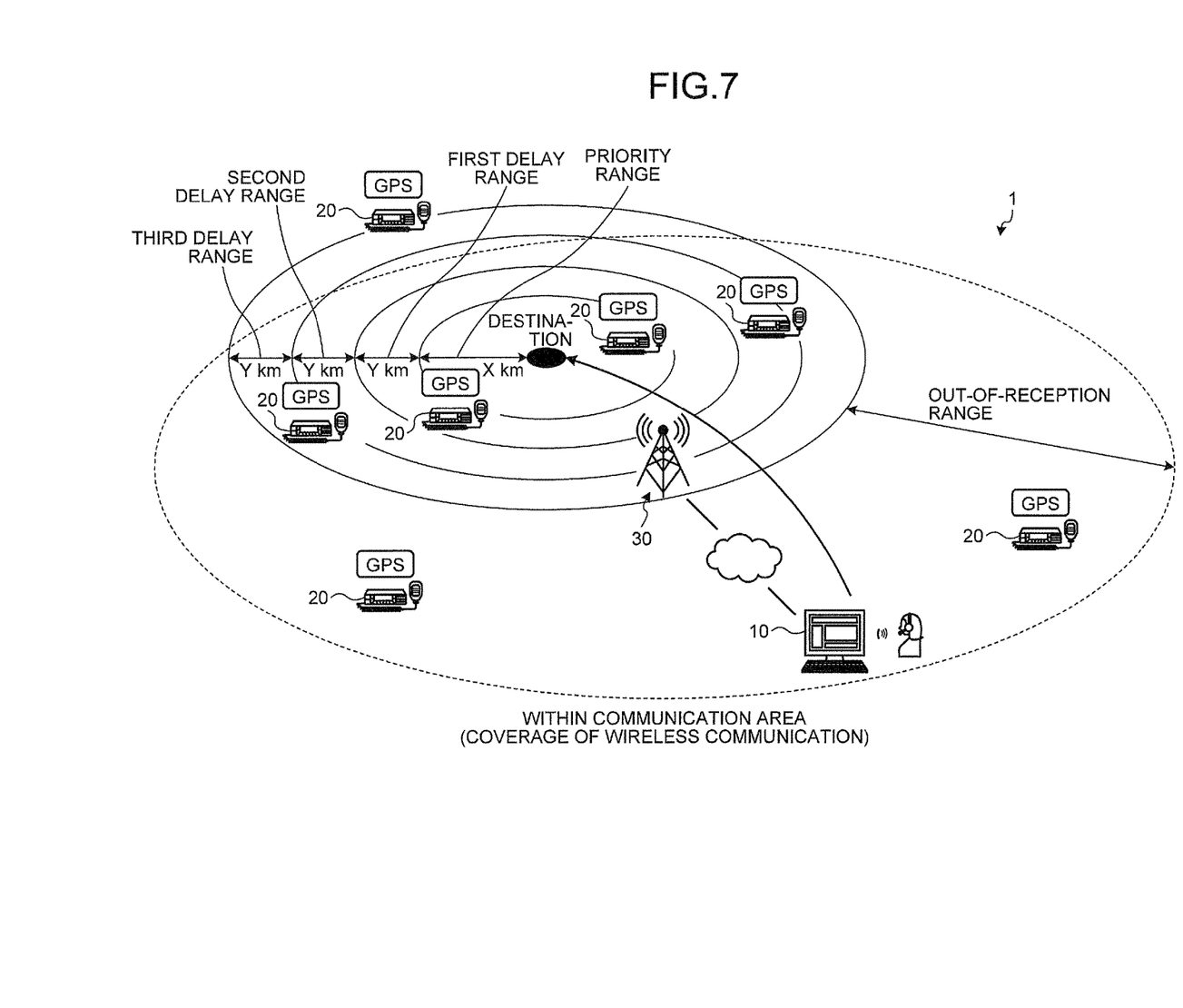
FIG. 7 is a diagram illustrating an example of a general configuration of the communication system of the second embodiment.

FIG. 6 is a diagram illustrating an example of communication information generated by the communication information generator 14 of the embodiment. In this example, the communication information further includes the priority range information which shows the priority range in which the transmission information is provided on a priority basis, the delay range information which shows the at least one delay range in which the transmission information is delayed to be provided, and the delay time information for specifying the delay time for each of the delay range. In the example of FIG. 6, the priority range information indicates that the priority range covers a radius of X km from the destination. The delay range information includes the amount of the delay range(s) and distance information, and indicates that the delay range is switched depending on the distance indicated by the distance information from the outer edge of the priority range. In the example of FIG. 6, the switching of the delay range takes place for every Y km from the outer edge of the priority range, and the amount of the delay range is three. When the delay ranges are designated as first delay range, second delay range, and third delay range in short-distance order to the priority range, the relationships among the priority range, the first delay range, the second delay range, and the third delay range are as illustrated in FIG. 7.

In the example of FIG. 6, the delay time information is information that indicates the delay time for the delay range, which increases for each delay range in the direction away from the priority range. In this example, the delay time corresponding to the first delay range is n (second), the delay time corresponding to the second delay range is n×2 (second), and the delay time corresponding to the third delay range is n×3 (second).

In the embodiment, when the a local station belongs to the priority range, the controller 25 of the mobile wireless terminal 20 controls the notification starting time at a predetermined value (for example, the value at which the transmission information is started to be provided immediately), and when the local station belongs to a delay range, the controller 25 of the mobile wireless terminal 20 controls the notification starting time at a value obtained by adding the delay time corresponding to the delay range to which the local station belongs to the predetermined value. For example, when the local station belongs to the first delay range, the controller 25 controls the notification starting time at the value obtained by adding the delay time (n (second)) corresponding to the first delay range to the predetermined value. For example, when the local station belongs to the second delay range, the controller 25 controls the notification starting time at the value obtained by adding the delay time (n×2 (second)) corresponding to the second delay range to the predetermined value. For example, when the local station belongs to the third delay range, the controller 25 controls the notification starting time at the value obtained by adding the delay time (n×3 (second)) corresponding to the third delay range to the predetermined value.

When the local station does not belong to the priority range or the delay ranges, the controller 25 does not provide the transmission information.

Figure 8:
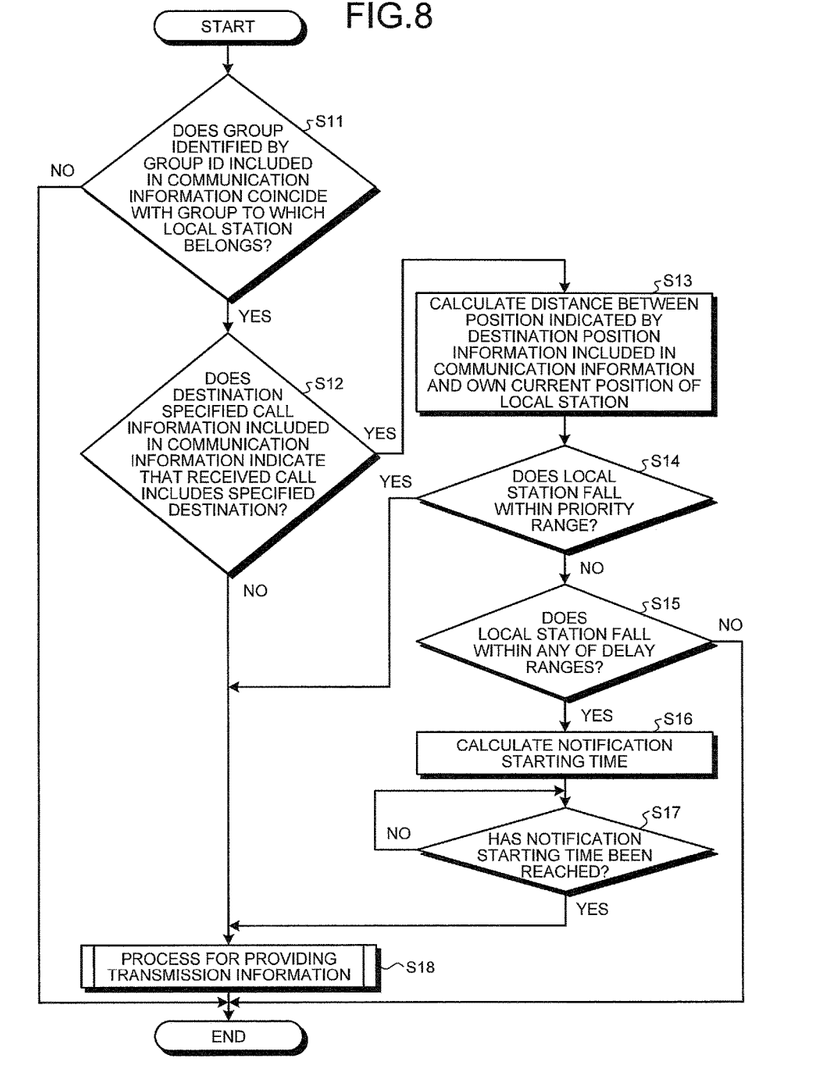
FIG. 8 is a flowchart of an operation example of the mobile wireless terminal of the second embodiment.

FIG. 8 is a flowchart of an operation example of the mobile wireless terminal 20 of the embodiment when the communication information is received from the base station 10. As described in FIG. 8, the controller 25 determines whether the group identified by the group ID included in the communication information received by the receiver 21 coincides with the group to which its own group belongs (step S11). When the result at step S11 is negative (step S11: No), the controller 25 terminates the process. When the result at step S11 is affirmative (step S11: Yes), the controller 25 determines whether the destination-specified call information included in the communication information indicates that a received call includes the specified destination (step S12).

When the result at step S12 is negative (step S12: No), the controller 25 moves the process to step S18 described later. When the result at step S12 is affirmative (step S2: Yes), the controller 25 calculates the distance between the position indicated by the destination position information included in the communication information and the own current position of the local station (step S13). Next, the controller 25 determines whether the position of the local station falls within the priority range, based on the distance calculated at step S13 and the priority range information included in the communication information (step S14). For example, when the distance calculated at step S13 has a value equal to or smaller than the radius of the priority range, the controller 25 determines that the local station falls within the priority range. When the distance has a value larger than the radius of the priority range, the controller 25 determines that the local station does not fall within the priority range.

When the result at step S14 is affirmative (step S14: Yes), the controller 25 moves the process to step S18 described later. When the result at step S14 is negative (step S14: No), the controller 25 determines which of the delay ranges the local station falls within, based on the distance calculated at step S13 and the delay range information included in the communication information (step S15).

When the result at step S15 is affirmative (step S15: Yes), the controller 25 calculates the notification starting time (step S16). As described above, the controller 25 calculates the notification starting time by adding the delay time corresponding to the delay range to which the local station belongs to the predetermined value, and sets the timer. When the result at step S15 is negative (step S15: No), the controller 25 terminates the process (the transmission information is not provided).

Next, the controller 25 determines whether the notification starting time has been reached (step S17). When the result at step S17 is affirmative (step S17: Yes), the controller 25 performs the process for providing the transmission information (step S18).

In the foregoing embodiment, the mobile wireless terminal 20 may further include a function of searching for a path to the destination, and the controller 25 may calculate a time required for moving from the own current position of the local station to the position indicated by the destination position information included in the communication information received from the base station 10 (for example, the time may be calculated taking traffic congestion information into account) and perform control to delay the notification starting time depending on the calculated required time. That is, the controller 25 may perform control to delay increasingly the notification starting time at which the transmission information is started to be provided as the time required for moving from the own current position of the local station to the position indicated by the destination position information received by the receiver 21 is longer.

Third Embodiment

Next, a third embodiment will be explained. Descriptions of the parts identical to those of the first and second embodiments will be omitted.

As in the second embodiment described above with reference to FIG. 5, a base station 10 of the embodiment has an acceptance unit 11, a destination position information request unit 12, a destination position information acquisition unit 13, a communication information generator 14, a transmitter 15, and a range specification unit 16.

In the embodiment, the range specification unit 16 specifies a range (region) within the communication area. For example, the range specification unit 16 may specify one or more ranges according to the operator's operation or may be specify pre-set one or more ranges.

The communication information generator 14 generates communication information including the transmission information, and association information in which range information is associated with delay time information. The range information shows one or more ranges within the communication area. The delay time information shows one or more delay times corresponding to the areas in the range information, at which the transmission information being delayed to be provided, and the value of which is smaller as the destination is closer. In this example, the communication information further includes the group ID for identification of the group to perform group communication and the destination-specified call information indicating whether a received call includes the specified destination.

Figure 9:
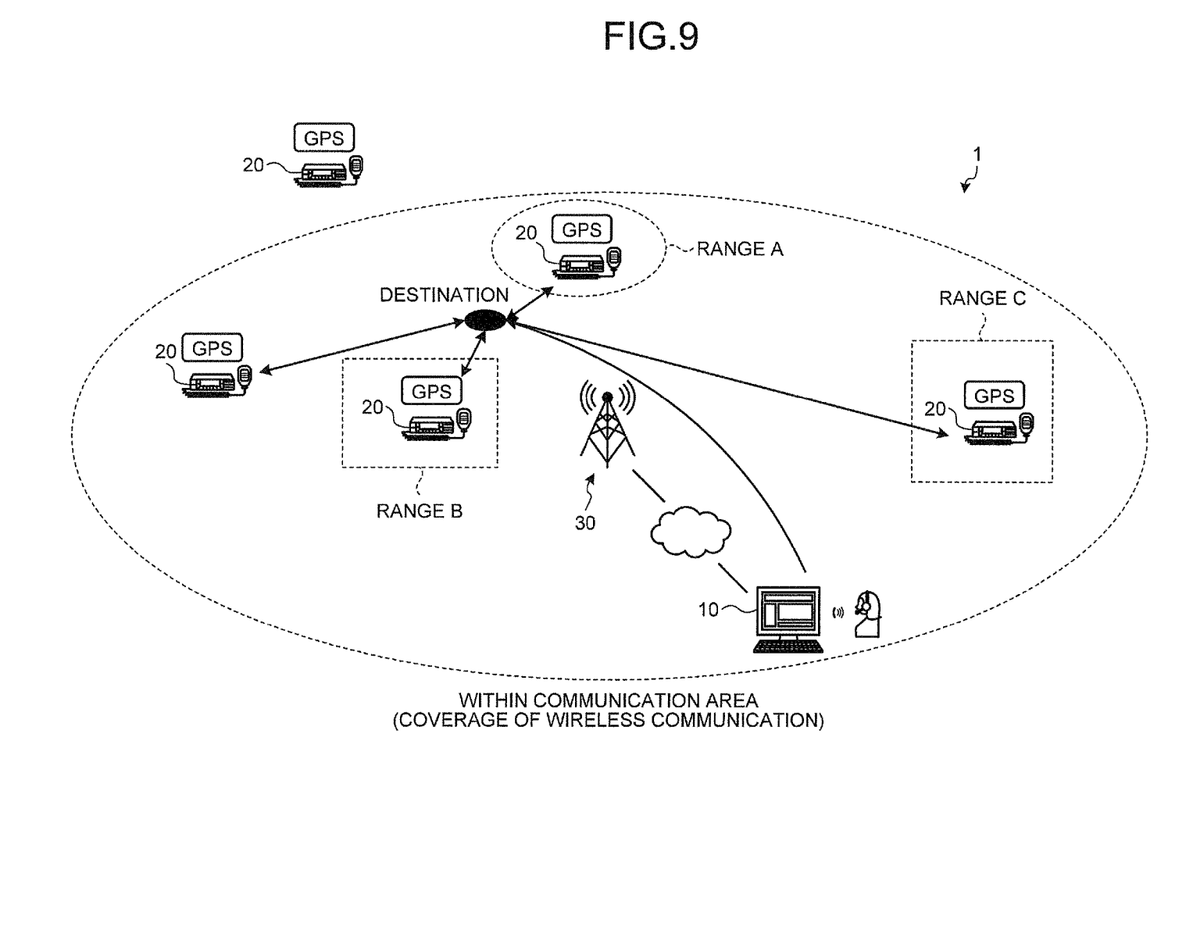
FIG. 9 is a diagram illustrating three ranges specified by a range specification unit of a third embodiment.
Figure 10:
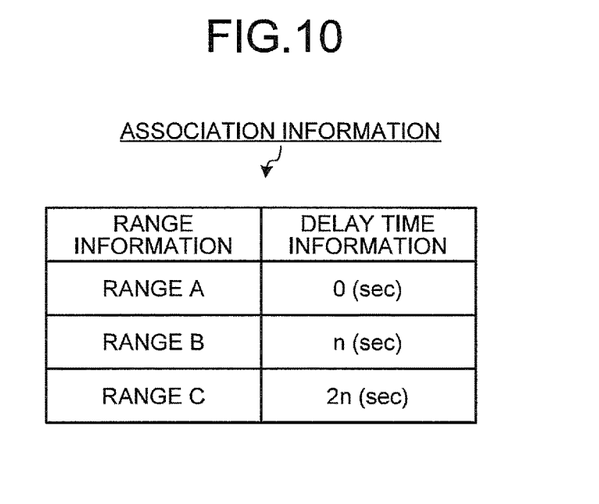
FIG. 10 is a diagram illustrating an example of association information of the third embodiment.

The association information of the embodiment is information in which one or more delay times in the delay time information are associated with one or more ranges in the range information which correspond to one or more specified ranges by the range specification unit 16 such that the delay time is smaller as the range in the range information is closer to the destination. The one or more ranges in the range information correspond on a one-to-one basis to the one or more specified range by the range specification unit 16. For example, the communication information generator 14 decides the respective delay times for the one or more ranges specified by the range specification unit 16 such that the delay time is smaller as the range is closer to the destination, based on the destination position information acquired by the destination position information acquisition unit 13 and the one or more ranges specified by the range specification unit 16. The communication information generator 14 can generate the association information by associating the one or more range in the range information which is corresponding on a one-to-one basis to the one or more ranges specified by the range specification unit 16 with the delay times in the delay information which shows the decided delay times. For example, the range specification unit 16 specifies three ranges (range A, range B, and range C) as illustrated in FIG. 9. FIG. 10 is a diagram illustrating an example of the association information in this case. In the example of FIG. 10, the delay time in the delay time information associated with the range information which shows the range A closest to the destination indicates "0 second." The delay time in the delay time information associated with the range information which shows the range B closest to the destination next to the range A indicates "n seconds (>0)." The delay time in the delay time information associated with the range information which shows the range C most distant from the destination indicates "2n seconds." The ranges may have any shape such as circle, rectangle, or oval, for example.

Figure 11:
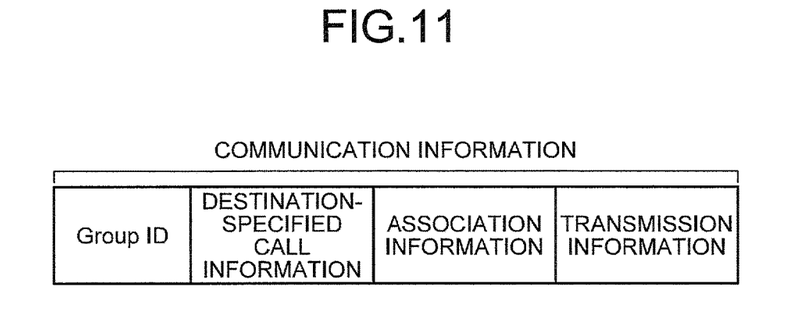
FIG. 11 is a diagram illustrating an example of communication information of the third embodiment.

The communication information generator 14 generates communication information including the thus generated association information, the transmission information corresponding to the first transmission request (the transmission information as a target of the first transmission request), the group ID for identification of the group specified by the first transmission request, and the destination-specified call information indicating that a received call includes the specified destination. FIG. 11 is a diagram illustrating an example of communication information generated by the communication information generator 14.

When the position of the local station is included in the one or more ranges in the range information included in the association information received by the receiver 21, the controller 25 performs control to delay the notification starting time at which the transmission information is started to be provided, according to the delay time information associated with the range information which shows the position of the local station. For example, suppose that the association information included in the communication information received by the receiver 21 is configured in the mode of FIG. 10. First, suppose that the controller 25 may determine that the local station falls within the range A based on three ranges in the range information included in the association information illustrated in FIG. 10 (in the example of FIG. 10, the three ranges correspond to the range information which shows the range A, the range information which shows the range B, and the range information which shows the range C) and the position information on the local station. In the association information illustrated in FIG. 10, since the delay time in the delay time information associated with the range in the range information which shows the range A indicates "0 second", the controller 25 can calculate the notification starting time such that the transmission information is started to be provided immediately. In the following description, the value of the notification starting time calculated in this case will be called "predetermined value." For example, the notification starting time may be a waiting time until the start of the notification, and the predetermined value in this case is "0 second." In addition, suppose that the controller 25 may determine that the local station falls within the range B based on the three ranges in the range information included in the association information illustrated in FIG. 10 and the position information on the local station. In the association information illustrated in FIG. 10, since the delay time in the delay time information associated with the range in the range information which shows the range B indicates "n seconds", the controller 25 can calculate the notification starting time by adding n seconds to the predetermined value. Further, suppose that the controller 25 may determine that the local station falls within the range C based on the three ranges in the range information included in the association information illustrated in FIG. 10 and the position information on the local station. In the association information illustrated in FIG. 10, since the delay time in the delay time information associated with the range in the range information which shows the range C indicates "2n seconds", the controller 25 can calculate the notification starting time by adding 2n seconds to the predetermined value.

After the calculation of the notification starting time, the controller 25 sets the timer for detecting that the notification starting time has been reached. When the timer has timed out, the controller 25 controls the annunciator 24 to provide the transmission information. When the notification starting time takes the foregoing predetermined value, the controller 25 may control the annunciator 24 to provide the transmission information immediately without setting the timer.

In this example, when the notification starting time has been reached, the controller 25 performs control to reproduce the audio information stored in the storage 22. More specifically, when the notification starting time has been reached, the controller 25 controls the annunciator 24 to output the notification starting sound, and then controls the annunciator 24 to reproduce the audio information stored in the storage 22.

When the local station does not fall within any of the ranges (the one or more ranges indicated by the one or more ranges in the range information included in the association information received by the receiver 21), the controller 25 may not provide the transmission information or may provide the transmission information with a delay of an arbitrary time in addition to the delay time indicated by the received maximum delay time information. The choice of which of the operations to be performed can be made on the mobile wireless terminal 20 side.

Figure 12:
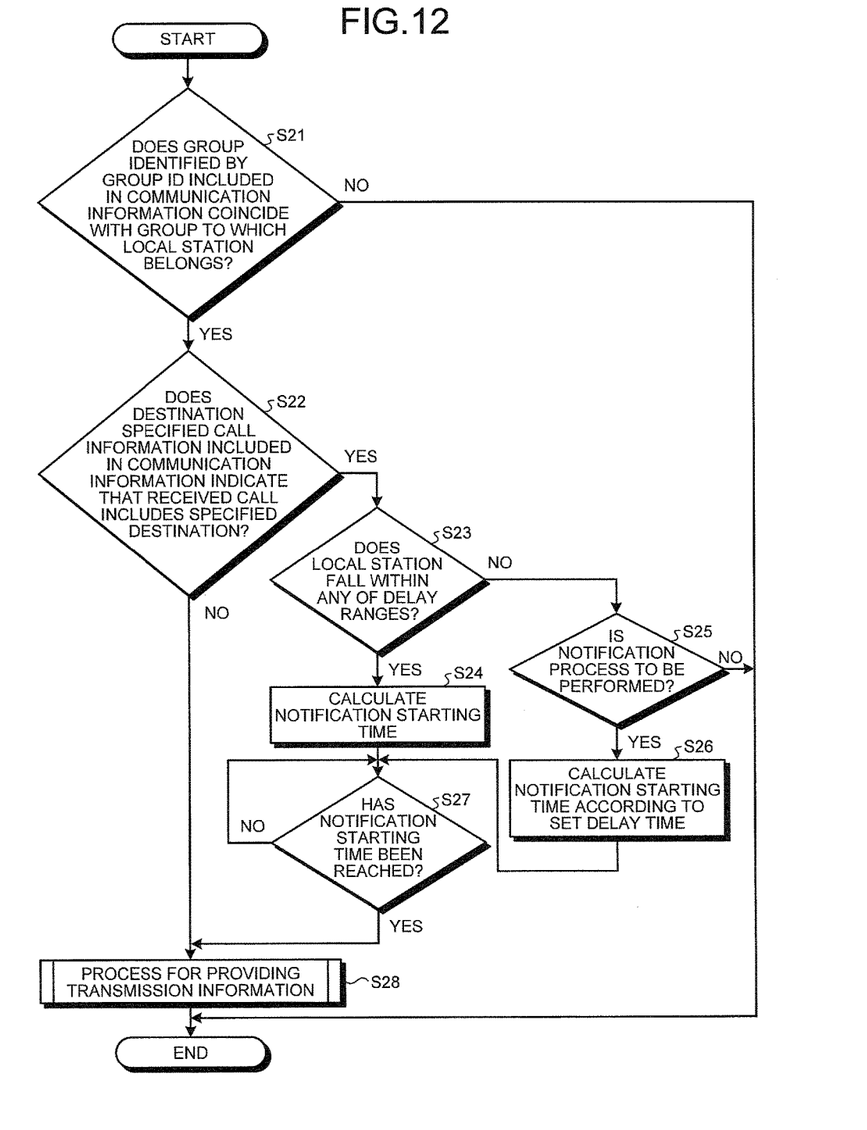
FIG. 12 is a flowchart of an operation example of the mobile wireless terminal of the third embodiment.

FIG. 12 is a flowchart of an operation example of the mobile wireless terminal 20 of the embodiment in the case in which the communication information is received from the base station 10. As described in FIG. 12, the controller 25 determines whether the group identified by the group ID included in the communication information received by the receiver 21 coincides with the group to which the local station belongs (step S21). When the result at step S21 is negative (step S21: No), the controller 25 terminates the process. When the result at step S21 is affirmative (step S21: Yes), the controller 25 determines whether the destination-specified call information included in the communication information indicates that a received call includes the specified destination (step S22).

When the result at step S22 is affirmative (step S22: Yes), the controller 25 determines whether the local station belongs to any of the ranges (any of the one or more ranges indicated by the one or more ranges in the range information included in the association information) based on the one or more ranges in the range information included in the association information of the communication information and the own current position of the local station (step S23).

When the result at step S23 is affirmative (step S23: Yes), the controller 25 calculates the notification starting time (step S24). As described above, the controller 25 calculates the notification starting time by adding the time indicated by the delay time information associated with the range to which the local station belongs to the predetermined value (step S24), and sets the timer. When the result at step S23 is negative (step S23: No), the controller 25 determines whether the notification process is to be performed (step S25). When the result at step S25 is negative (step S25: No), the controller 25 terminates the process (the transmission information is not provided). When the result at step S25 is affirmative (step S25: Yes), the controller 25 calculates the notification starting time according to the delay time which is set to be delayed by an arbitrary time in addition to the maximum delay time among the delay times in the delay time information included in the association information (step S26). For example, the controller 25 may calculate the notification starting time by adding the delay time set above to the foregoing predetermined value.

After step S24 or S26, the controller 25 determines whether the notification starting time has been reached (step S27). In this example, the controller 25 can determine whether the notification starting time has been reached by checking if the timer has timed out. When the result at step S27 is affirmative (step S27: Yes), the controller 25 controls the annunciator 24 to provide the transmission information. That is, the controller 25 performs the process for providing the transmission information (step S28). The specific contents of the process are as described above.

When the result at step S22 is negative (step S22: No), the controller 25 moves directly to step S28.

As described above, the base station 10 of the embodiment transmits to the mobile wireless terminal 20 the communication information including the transmission information and the association information in which the one or more ranges in the range information which shows the ranges within the communication area are associated with the delay times in the delay time information that indicates the times by which the transmission information is delayed to be started and the value of which is smaller as the destination is closer. On receipt of the communication information, when the position of the local station is included in the one or more ranges in the range information included in the association information of the communication information, the mobile wireless terminal 20 performs control to delay the notification starting time at which the transmission information is started to be provided, according to the delay time in the delay information associated with the range in the range information which shows the position of the local station. This makes it possible to implement the system in which the mobile station closer to the destination can make a response on a priority basis.

According to the present invention, it is possible to implement the system in which the mobile station closer to the destination can make a response on a priority basis.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A mobile wireless terminal comprising:
   a storage configured to store computer executable instructions; and
   a processor configured to execute the computer executable instructions to perform operations, comprising:
      receiving from a base station communication information including transmission information and destination position information which shows a position of a destination;
      providing the transmission information to a user of the mobile wireless terminal;
      performing control to decide notification starting time for providing the transmission information based on a distance between the position of the destination indicated by the destination position information and a position of the mobile wireless terminal; and
      transmitting, when the mobile wireless terminal makes a response to the transmission information, response information to other mobile wireless terminals, indicating that the response has been already made,
   further comprising:
      when the response information is received from another mobile wireless terminal during providing the transmission information, performing control to stop providing the transmission information, and
      when the response information is received from another mobile wireless terminal before providing the transmission information, performing control not to provide the transmission information.

* * * * *